US011862095B2

(12) United States Patent
Kim et al.

(10) Patent No.: US 11,862,095 B2
(45) Date of Patent: Jan. 2, 2024

(54) OLED-BASED DISPLAY HAVING PIXEL COMPENSATION AND METHOD

(71) Applicant: eMagin Corporation, Hopewell Junction, NY (US)

(72) Inventors: Seonki Kim, Fishkill, NY (US); Amalkumar P. Ghosh, Hopewell Junction, NY (US); Olivier Prache, Pleasantville, NY (US); Hyuk Sang Kwon, Sunnyvale, CA (US)

(73) Assignee: eMagin Corporation, Hopewell Junction, NY (US)

( * ) Notice: Subject to any disclaimer, the term of this patent is extended or adjusted under 35 U.S.C. 154(b) by 37 days.

(21) Appl. No.: 17/840,375

(22) Filed: Jun. 14, 2022

(65) Prior Publication Data

US 2022/0406258 A1 Dec. 22, 2022

Related U.S. Application Data

(60) Provisional application No. 63/211,749, filed on Jun. 17, 2021.

(51) Int. Cl.

*G01J 1/42* (2006.01)
*G01J 1/16* (2006.01)

(Continued)

(52) U.S. Cl.

CPC ......... *G09G 3/3258* (2013.01); *G09G 3/3233* (2013.01); *G09G 2320/0233* (2013.01); *G09G 2320/064* (2013.01)

(58) Field of Classification Search

None

See application file for complete search history.

(56) References Cited

U.S. PATENT DOCUMENTS

| | | | | |
|---|---|---|---|---|
| 7,321,348 | B2 | 1/2008 | Cok et al. | |
| 11,164,543 | B1 * | 11/2021 | Gao | G09G 3/2074 |

(Continued)

FOREIGN PATENT DOCUMENTS

| | | | |
|---|---|---|---|
| CN | 109791753 | A | 5/2019 |
| CN | 112967679 | A | 6/2021 |
| TW | 201742274 | A | 12/2017 |

OTHER PUBLICATIONS

Matthew Hartensveld, "Fully Monolithic GaN μLED Display System", SID Society for Information Display, Jun. 28, 2021, pp. 880-883, vol. 52, Issue 1, https://doi.org/10.1002/sdtp.14825.

(Continued)

*Primary Examiner* — Martin Mushambo

(74) *Attorney, Agent, or Firm* — Kaplan Breyer Schwarz, LLP

(57) ABSTRACT

An OLED display system having compensation or loss of brightness is provided, including OLED-based display pixels, a sensing system having sensors, a processor having an LIA, an LPF, and analog to digital circuitry connected to each sensor and for providing a sensor signal for each sensor. The processor is adapted to apply a drive signal having a periodic signal to at least one OLED pixel in the display, receive the sensor signal, provide a primary frequency component from the sensor signals using the LIA based on the periodic signal, provide secondary frequency components from the sensor signals using the LPF, convert the secondary frequency components to a digital signal using the ADC, provide the digital signal to the processor as a sensing signal, and determine compensation for the drive signal. A method is also provided.

15 Claims, 6 Drawing Sheets

(51) Int. Cl.
*G09G 3/3258* (2016.01)
*G09G 3/3233* (2016.01)

(56) References Cited

U.S. PATENT DOCUMENTS

| | | | | |
|---|---|---|---|---|
| 11,594,582 | B2 * | 2/2023 | Han | G06V 40/1318 |
| 2005/0110420 | A1 * | 5/2005 | Arnold | G09G 3/3225 315/169.3 |
| 2008/0218453 | A1 * | 9/2008 | Miyamoto | G09G 3/3233 345/76 |
| 2011/0037786 | A1 * | 2/2011 | Hasegawa | G09G 3/3233 345/690 |
| 2016/0163261 | A1 * | 6/2016 | Kim | G09G 3/3225 345/205 |
| 2017/0092190 | A1 * | 3/2017 | Choe | G09G 3/2003 |
| 2017/0124943 | A1 * | 5/2017 | Peana | G09G 3/3225 |
| 2018/0018940 | A1 * | 1/2018 | Biebersdorf | G09G 5/10 |
| 2018/0075798 | A1 | 3/2018 | Nho et al. | |
| 2019/0172878 | A1 | 6/2019 | Trefonas, III et al. | |
| 2020/0105851 | A1 * | 4/2020 | Yazdandoost | G01J 1/4204 |
| 2020/0126510 | A1 * | 4/2020 | Shiokawa | G09G 5/003 |
| 2020/0372861 | A1 * | 11/2020 | Ok | G09G 3/3233 |

OTHER PUBLICATIONS

Authorized Officer: Taina Matos, International Search Report and Written Opinion issued in PCT application No. PCT/US2022/033480, dated Sep. 14, 2022, 9 pp.

Office Action issued in Taiwan Patent Application No. 111122723, dated Jul. 13, 2023, 9 pp. w/ translation.

* cited by examiner

OLED-BASED DISPLAY HAVING PIXEL COMPENSATION AND METHOD

CROSS REFERENCE TO RELATED APPLICATION

This application claims priority to U.S. Provisional Patent Application No. 63/211749, entitled High-Sensitivity External Sensor for Compensation of OLED-Based Display and Method Therefor, filed Jun. 17, 2021, pending, the complete specification of which is fully incorporated by reference herein.

BACKGROUND OF THE INVENTION

The present invention relates to image display technology and, more particularly, to visual-performance compensation of organic light-emitting diode (OLED) pixels within an OLED-based display.

Organic Light-Emitting Diode (OLED) displays include an array of pixels, each of which typically includes at least one OLED for providing light. Each OLED includes a light-emitting layer (or multiple sub-layers) of a luminescent organic material that is located between a cathode and an anode. In response to an electrical signal applied to the cathode and anode, the luminescent organic material emits light. By applying an appropriate drive signal to the pixels, a desired image is produced by the display.

As is well-known to one skilled in the art, as usage time accrues for an OLED element, it suffers degradation that manifests as loss of brightness. As a result, a variation in the brightness of the OLED-based pixels across a display will arise over time, due to differences in the amount of stress each is subjected to over time, as well as the accumulated duration of that stress. For example, in some cases, some OLEDs within a display are under more stress than others due to fixed symbology, patterns or icons. Unfortunately, the locations and severity of the degradation among the pixels cannot be identified without sensing individual pixels.

Compensating degradation of pixel brightness in an OLED display is challenging, however, due to intrinsic signal characteristics, such as small electrical amplitude of nano-Ampere ranges (nA) in a typical pixel driving circuit. Further complicating the matter, the amount of space available in the pixel regions is limited—particularly for high-density displays used, for example, microdisplays in near-eye applications such as augmented reality (AR) and virtual reality (VR) devices (e.g., micro displays having more than a couple of thousands of dots per inch). Typically, these pixel regions are already space-limited due to the high density of electrical components (e.g., transistors, capacitors, etc.) they require. As a result, adding extra components for pixel compensation without negatively impacting overall signal integrity or manufacturing yields is difficult, if not impossible.

Conventional approaches for visual-performance compensation employ sensing units built into the display backplane in regions outside the active-pixel region (i.e., display region) of the display. One exemplary approach includes placing a reference pixel (or more than one) on the substrate of the active pixel array just outside the display region. A voltage change across the reference pixel is measured and used to compensate pixels within the display region according to the measured change. Such approaches are described, for example, in U.S. Pat. No. 7,321,348 (Cok et al.), which is fully incorporated herein by reference.

Another exemplary prior-art approach for compensation includes measuring the initial state of each active pixel in the display region, measuring its current value via a feedback loop on the backplane of the system and storing it in memory. A resistance change corresponding to OLED degradation can be determined by observing current feedback and used to set a compensation level for each OLED. Such approaches are described, for example, in U.S. Patent Publ. No. 2005/0110420 (Arnold et al.), which is fully incorporated herein by reference.

Unfortunately, such prior-art compensation approaches are insufficient for many applications and significantly increase the cost and complexity of a display and its backplane technology.

The need for providing visual-performance compensation in an OLED-based display in a practical, low-cost manner remains, as yet, unmet in the prior art.

SUMMARY OF THE INVENTION

The present disclosure is directed to visual-performance compensation of OLED-based displays using sensors that are external to the backplane of the display, where the sensitivity of the sensors is enhanced to overcome low optical signal powers that are sometimes associated with such arrangements. The sensitivity of the sensors is improved by embedding a periodic signal into the output of the display pixels and detecting the periodic signal using a compact lock-in amplifier located on an ASIC mounted on a carrier board that is external to the backplane.

An illustrative embodiment comprises a conventional OLED display disposed on a silicon backplane, a plurality of sensors located near the OLED emission area, and an ASIC that is external to the backplane and contains processing circuitry that includes a compact lock-in amplifier. In some embodiments, only a single sensor is used to detect the brightness from the emission window.

In some embodiments, optical elements, such as diffraction gratings, angled facets, turning mirrors, etc., are disposed on one or more edges of the glass cover plate of the display for improving the light-collection efficiency of the sensors.

In operation, OLEDs included in a plurality of pixels are modulated at a known primary frequency. Light from the active-OLED display region, as well as stray light from the ambient environment surrounding the display is received as a noise-mixed signal at one or more of the sensors in the sensor system. The sensor system provides an electrical output signal to the processing circuitry and the lock-in amplifier, which detects the primary frequency, enabling its selective detection from the noise-mixed signal. The luminance of the one or more pixels is then determined from the detected primary-frequency signal.

In some embodiments, an OLED of only one pixel is modulated with a primary frequency.

In some embodiments, the processing circuitry includes a low-pass filter for suppressing residual high-frequency components in the noise-mixed signal or the detected primary-frequency signal.

In a first exemplary embodiment of the present invention, an organic light-emitting diode (OLED) display system having visual performance pixel compensation or loss of brightness is provided. The OLED display system includes OLED-based display pixels, where each display pixel has pixel drive circuitry, a sensing system including sensors; and a processor. The process includes a lock-in amplifier (LIA), a low pass filter (LPF); and analog to digital (ADC) circuitry operatively connected to each of the sensors. The ADC circuitry provides a sensor signal for each of the sensors. The processor is adapted to apply a drive signal having a periodic signal embedded therein to at least one OLED pixel in the display, receive the sensor signal from the ADC circuitry for each sensor, provide a primary frequency component from the sensor signals using the LIA based on the periodic signal, provide secondary frequency components from the sensor signals using the LPF, convert the secondary frequency components to a digital signal using the ADC, provide the digital signal to the processor as a sensing signal, and determine compensation for the drive signal.

The processor may include an amplifier. Here, the processor is adapted to amplify the secondary frequency components. The display system may include a preamplifier for amplifying the sensor signals from the ADC without adding significant noise to the signals. The sensors may be photodetectors. The sensors may be oriented orthogonally to a plane of the display system. The drive signal having the periodic signal may be modulated using pulse-width modulation (PWM) having the primary frequency. The periodic signal may be a display refresh rate multiplied by a number of pulse-width modulation pulses per display frame. At least one of the sensors may include a cover glass, a sensor and grating, wherein the grating has patterns of slits formed into at least one sidewall of the cover glass. At least one of the sensors of the sensing system may comprise a cover glass, a sensor, a facet and masking material. The facet may be a beveled edge of the cover glass configured to increase area available for mounting the sensor. The masking material may be for blocking and absorbing light received at the facet. The masking material may be a photoresist material.

A method for compensating at least one pixel for an image in an organic light-emitting diode display system is also provided. The display system includes OLED-based display pixels, wherein each display pixel has pixel drive circuitry. The method includes the step of providing a sensing system having sensors and a processor. The processor includes a lock-in amplifier (LIA), a low pass filter (LPF), and analog to digital (ADC) circuitry operatively connected to each of the sensors. The ADC circuitry provides a sensor signal for each of the sensors. The method continues with the steps of applying a drive signal having a periodic signal embedded therein to at least one OLED pixel in the display, receiving the sensor signal from the ADC circuitry for each sensor, providing a primary frequency component from the sensor signals using the LIA based on the periodic signal, providing secondary frequency components from the sensor signals using the LPF, converting the secondary frequency components to a digital signal using the ADC, providing the digital signal to the processor as a sensing signal, and determining compensation for the drive signal.

The step including providing the processor may include providing an amplifier. Here, the method may include amplifying the secondary frequency components. The step of providing the processor may include providing a preamplifier. Here, the method may include amplifying the sensor signals with the preamplifier from the ADC without adding significant noise to the signals. The method may include the step of modulating the drive signal using pulse-width modulation (PWM) having the primary frequency. The step of applying a drive signal having a periodic signal embedded therein may include a periodic signal calculated by a display refresh rate multiplied by a number of pulse-width modulation pulses per display frame.

DETAILED DESCRIPTION

Figure 1:
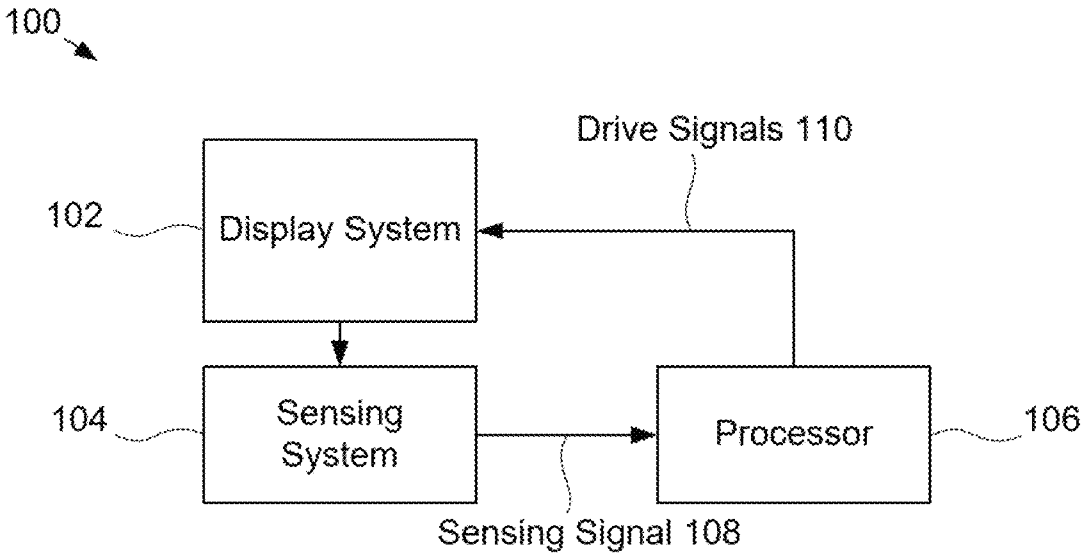
FIG. 1 depicts a schematic drawing of the salient features of an image-rendering system in accordance with an exemplary embodiment of the present invention.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventors to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The functions of the various elements shown in the Drawing, including any functional blocks that may be labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP)

hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

Unless otherwise explicitly specified herein, the figures comprising the drawing are not drawn to scale.

Referring now to the drawings, wherein like reference numbers refer to like elements throughout the several views, there is shown in FIG. 1, a schematic drawing of the salient features of an image-rendering system in accordance with the present disclosure. Display 100 includes display system 102, sensing system 104, and processor 106.

Display system 102 includes a plurality of display pixels, each of which contains a plurality of OLED-based sub-pixels, pixel-drive circuitry, and associated system electronics.

Sensing system 104 includes a plurality of sensors and analog-to-digital conversion (ADC) circuitry that is operatively coupled with the sensors.

Processor 106 is preferably an external processor configured to do at least some of: provide image data to display system 102; receive sensor signals from the ADC circuitry; run programs and store data; perform software routines for estimating the health (i.e., state of degradation) of one or more OLEDs in display area 202 (see FIG. 2); determine suitable drive-signal compensation for the OLEDs; and compensate the image data accordingly to provide the compensated drive signals to their corresponding display pixels. In the depicted example, processor 106 is incorporated into an image processing system, which is typically used to drive a conventional display. In some embodiments, however, processor 106 includes hardware and/or firmware that is local to the display system and/or sensing system. In some embodiments, it is preferable that methods for determining the required compensation are integrated into the firmware of a display.

Figure 2:
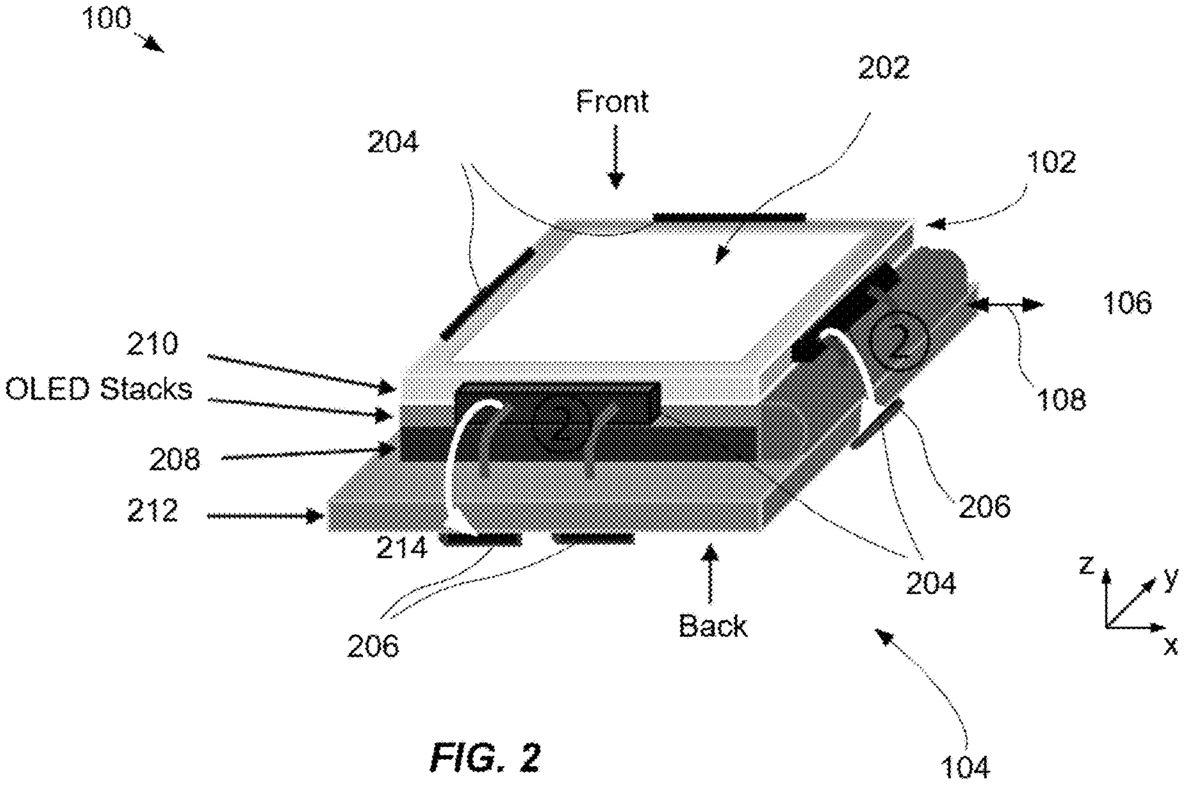
FIG. 2 depicts a schematic drawing of a more detailed perspective view of a portion of a display of FIG. 1.

FIG. 2 depicts a schematic drawing of a more detailed perspective view of a portion of display 100.

Display system 102 includes display region 202, which is the region of the display in which images are generated by emission of light from the plurality of OLED-based pixels. Display region 202 (also referred to as the "active OLED pixel area") comprises a plurality of display pixels, each of which includes at least one OLED and its associated pixel-drive circuitry, as well as any other associated electronic circuitry.

The plurality of OLEDs and their associated drive circuitry are located on substrate 208, which defines the backplane of display region 202. The display area is covered by cover glass 210 and substrate 208 is disposed on the front surface of carrier board 212.

Sensing system 104 includes sensors 204 and analog-to-digital conversion (ADC) circuitry 206.

Sensors 204 are conventional optical sensors that are arranged around the perimeter of display area 202. In the depicted example, each of sensors 204 is a conventional photodetector; however, any suitable sensor can be used in sensing system 104 without departing from the scope of the present invention. Sensors 204 are arranged such that their respective substrates are oriented orthogonally to the plane of substrate 208 and, as a result, they receive light from the OLEDs at the edges of cover glass 210. In some embodiments, cover glass 210 includes optical elements (e.g., diffractive optical elements, holograms, prisms, angled mirrors, etc.) for improving the ability of sensors 204 to sense the luminescence of one or more of the OLEDs of the display pixels.

ADC circuitry 206 comprises one or more conventional analog-to-digital converter circuits and associated additional components suitable for converting the output of sensors 204 into digital signals usable by processor 106.

As would be apparent to one skilled in the art, after reading this Specification, optical sensors (e.g., photodetectors) can have limited sensitivity in the range of low brightness of an OLED microdisplay. As a result, the luminance intensity of a single pixel (or sub-pixel) in a display can be too small to be measured by some sensors. Furthermore, pixel-to-pixel differences in brightness can be extremely small relative to the sensitivity of such sensors, making it difficult, if not impossible, for a post-processing circuit to differentiate the difference in an external compensation system.

It is an aspect of the present disclosure, however, that a test image can be generated by the display and used to determine which, if any, OLEDs in the display require compensation and how to compensate them. Specifically, by embedding a periodic function in the output of each OLED under test and employing lock-in amplifier detection techniques in the detection of their output signals, sensor sensitivity can be enhanced. It should be noted that, in some cases, such an image can be limited to the output of only one pixel if the sensitivity of the sensor or sensors is sufficient. Furthermore, methods disclosed herein enable a learning process in which the number of pixels required in a test image can be experimentally determined over time.

In addition, the light-collection efficiency of the sensors can be improved by including grating slits on the edges of cover glass 210, thereby further enhancing the overall light-detection sensitivity in an external sensor-based compensation system for an OLED microdisplay.

Figure 3:
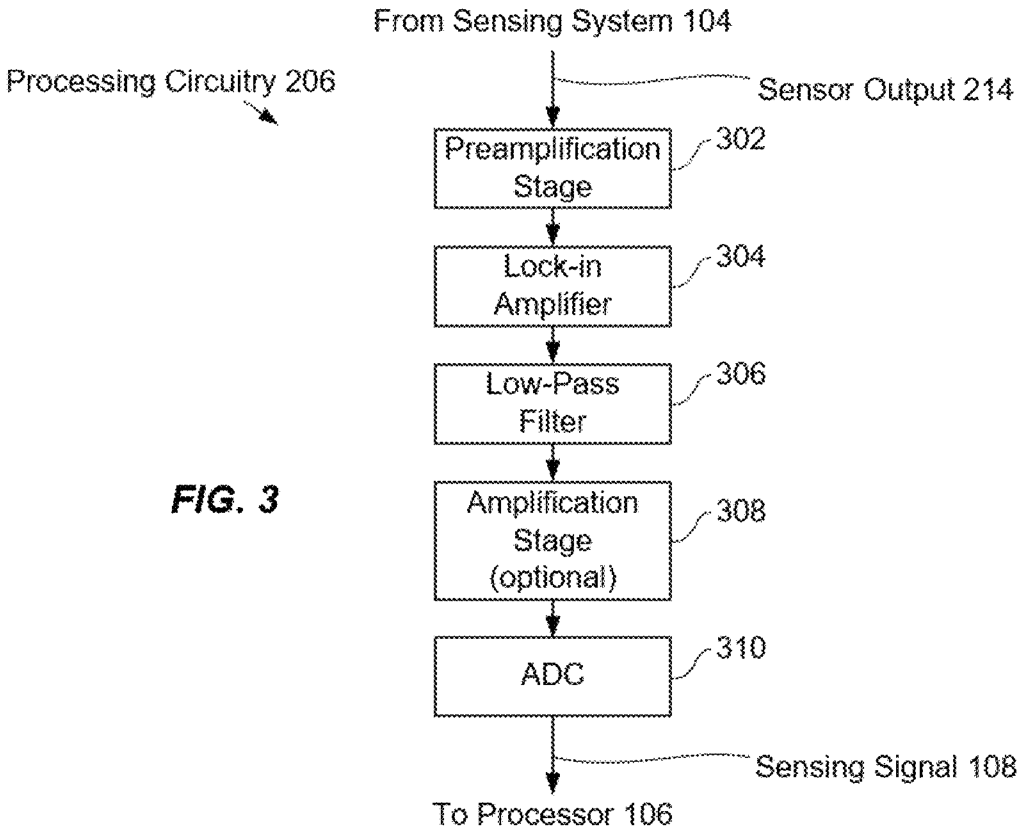
FIG. 3 depicts a block diagram of the salient components of processing circuitry in accordance with the exemplary embodiment of the present invention.

FIG. 3 depicts a block diagram of the salient components of processing circuitry in accordance with the present disclosure. Processing circuitry 206 includes optional preamplification stage 302, lock-in amplifier (LIA) 304, low-pass filter (LPF) 306, optional amplification stage 308, and analog-to-digital converter 310.

Figure 4:
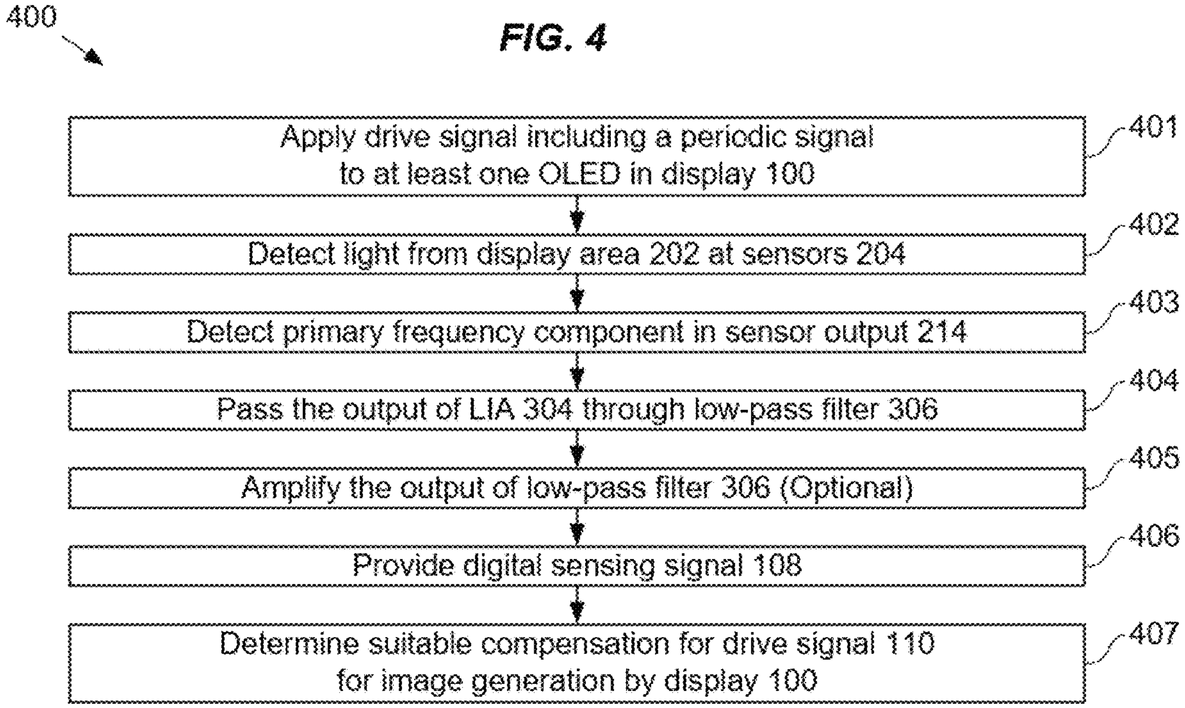
FIG. 4 depicts a flowchart of a method for compensating one or more pixels in a display in accordance with the exemplary embodiment of the present invention.

FIG. 4 depicts operations of a method for compensating one or more pixels in a display in accordance with the present disclosure. Method 400 begins with operation 401, wherein processor 106 applies drive signal 110 to a group of OLEDs within display area 202, where a periodic signal is embedded in the drive signal. In some embodiments, processor 106 applies a drive signal containing a periodic signal to only one OLED in display 100. It should be noted that, typically, a periodic signal having high modulation frequency is preferred, since a high modulation frequency has less noise influence than a low one.

In the depicted example, the applied drive signal is modulated using pulse-width modulation (PWM) having a primary frequency; however, any suitable modulation scheme can be used to modulate the output of the pixels under test without departing from the scope of the present disclosure.

Figure 5:
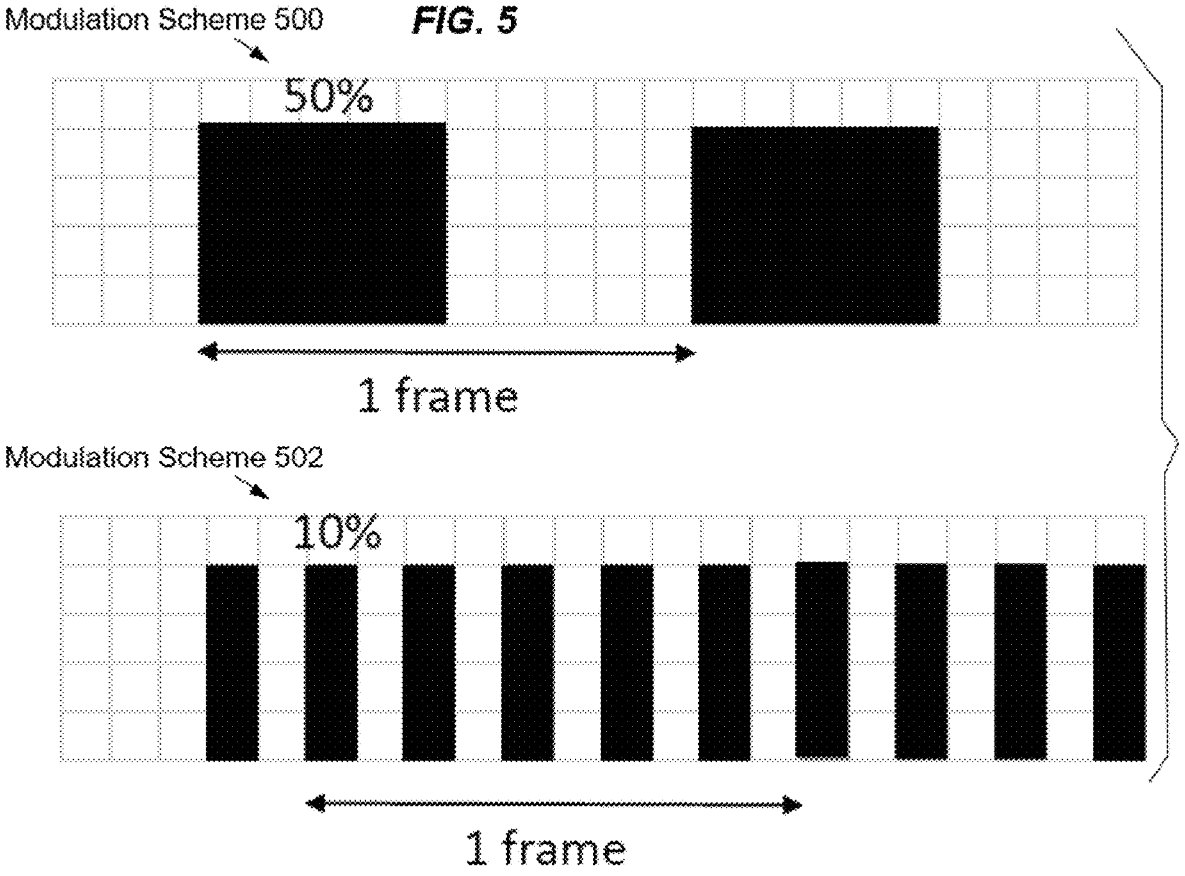
FIG. 5 depicts two exemplary graphical illustrations of modulation signals suitable for embedding in the drive signals provided to OLEDs under test in accordance with the exemplary embodiment of the present invention.

FIG. 5 depicts two exemplary modulation signals suitable for embedding in the drive signals provided to OLEDs under test in accordance with the present disclosure.

Modulation signal 500 has a 50% duty cycle and is implemented using a signal continuous pulse period that occupies the first half of each display frame.

Modulation signal 502 also has a 50% duty cycle; however, it is implemented using five of short pulse periods within each display frame.

For each modulation signal, the primary modulation frequency is given by the display refresh rate (i.e., the number of display frames per second) multiplied by the number of PWM pulses per display frame. For each of exemplary modulation signals 500 and 502, the frame refresh rate is equal to 120 frames per second. As a result, the primary modulation frequencies of modulation signals 500 and 502 are 120 Hz and 600 Hz, respectively. As noted above, a periodic signal having higher modulation frequency typically has less noise influence than a periodic signal having a lower-frequency. As a result, modulation signal 502 would normally be preferred over modulation signal 500.

At operation 402, sensors 204 detect light from display area 202. As will be apparent to one skilled in the art, after reading this Specification, the light detected by sensors 204 is a "mixed-luminance signal" that includes the optical signals generated by each driven OLED (i.e., "pixel luminance"), as well as optical noise comprising stray light from the environment surrounding display area 202. In some cases, the optical noise luminance can be stronger than the pixel luminance; therefore, the optical noise luminance will dominate the sensor output. As a result, sensor output 108 will provide incorrect optical information to processor 106, leading to incorrect compensation for the aging of OLEDs in the display.

It is necessary, therefore, to selectively pick out the pixel luminance from the noisy mixed-luminance signal so that the pixel aging can be accurately determined and proper compensation can be applied to the OLEDs.

Optional preamplification stage 302 is a conventional preamplifier suitable for amplifying sensor output 214 without adding significant noise to the signal. It should be noted that, after the pre-amplification stage, the PWM modulation frequency will remain dominant in sensor output 214.

At operation 403, synchronous demodulation is used to detect the primary frequency component in sensor output 214.

In the depicted example, synchronous demodulation is performed via LIA 304, which selectively detects the primary frequency component in sensor output 214 based on the known modulation applied to drive signal 110 provided by processor 106. The known modulation is frequency is typically provided to LIA 304 by processor 106 so that it can be used as a demodulation reference frequency.

LIA 304 is a compact lock-in amplifier circuit fabricated on an application-specific integrated circuit (ASIC) that is external to the backplane of display 100.

LIA 304 detects the primary frequency of the PWM component in sensor output 214 thereby enabling the pixel luminescence to be isolated from noise signals arising from the environment around display area 202.

In some embodiments, LIA 304 selectively chooses the primary modulated signal, demodulates it and gets the DC component, which can differ from brightness intensity.

At operation 404, residual frequencies from the LIA are filtered out via conventional low-pass-filter (LPF) 306.

At optional operation 405, the output of low-pass filter 306 is amplified by optional amplification stage 308. In the depicted example, amplification stage 308 comprises an operational amplifier, as well as other associated circuitry.

At operation 406, the output of low-pass filter 306 is converted to a digital signal via conventional analog-to-digital converter (ADC) 310 and provided to processor 106 as sensing signal 108.

The ability to selectively detect the primary frequency of the modulated output of one or more OLEDs from a display affords embodiments in accordance with the present disclosure significant advantages over the prior art, including:

i. external sensor sensitivity can be enhanced and a difference in negligibly low brightness ranges can be detected in pixel compensation methods in an OLED-based microdisplay; or ii. valid signal components can be selectively chosen from the output mixed with considerable noise components; or iii. the combination of i and ii.

It should be noted that, in some embodiments, one or both of preamplification stage 302 and amplification stage 308 are not included in processing circuitry 206.

At operation 407, processor determines a suitable compensation for drive signal 110 during image generation based on sensing signal 108.

In some embodiments, additional compensation methods are used to augment the methods and apparatus described herein, such as compensation methods described in U.S. Provisional Patent Application Ser. No. 63/209,215, filed Jun. 10, 2021, entitled "OLED-Based Display Having Pixel Compensation and Method", which is incorporated herein by reference.

In some embodiments, it is desirable to improve the amount of light collected by sensors 204 by including one or more optical elements on or in cover glass 210.

Figure 6A:
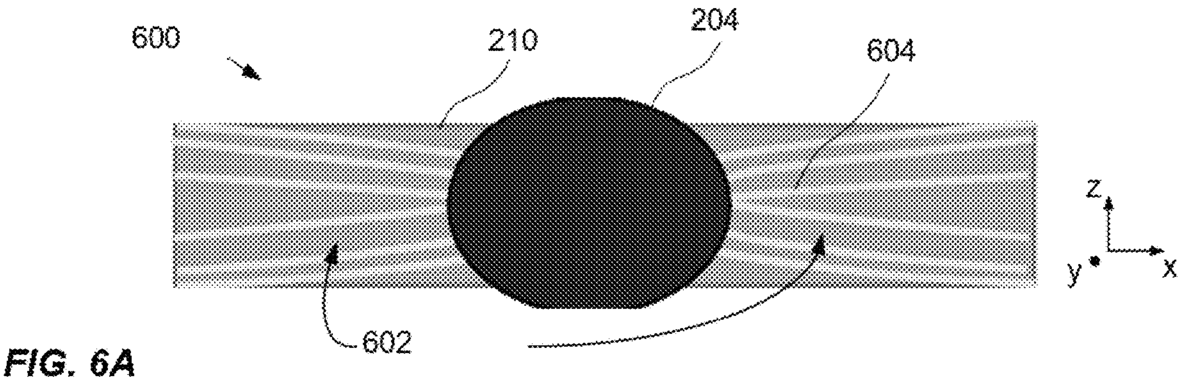
FIGS. 6A and 6B depict simplified schematic drawings of exemplary optical elements suitable for inclusion in the cover glass of a display to improve the light-collection efficiency of externally located sensors in accordance with the exemplary embodiment of the present invention.
Figure 6B:
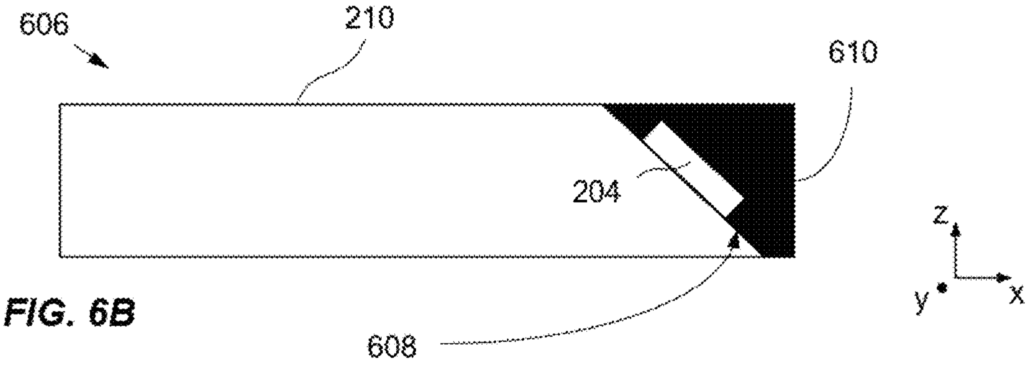

FIGS. 6A and 6B depict schematic drawings of exemplary optical elements suitable for inclusion in the cover glass of a display to improve the light-collection efficiency of externally located sensors in accordance with the present disclosure.

Arrangement 600 includes cover glass 210, sensor 204, and grating 602.

Grating 602 comprises a pattern of slits 604 formed at the edge of cover glass 210. Slits 604 are narrow (e.g., of order 10 microns, or tens of microns, wide, etc.) features formed into the sidewalls of the cover glass.

In the depicted example, slits 604 are formed into the sidewalls of the cover glass using laser lithography; however, any suitable method for forming slits 604 can be used. Methods suitable for forming slits 604 include, without limitation, laser-assisted etching, single-point diamond machining, laser ablation, particle blasting, and the like. In some embodiments, grating 602 includes patterns of material deposited onto the sidewalls of cover glass 210 via methods such as shadow-mask deposition, and the like.

Arrangement 606 includes cover glass 210, sensor 204, facet 608, and masking material 610.

Facet 608 is a beveled edge of the cover glass that is configured to increase the area available for mounting sensor 204. In some cases, the beveled edge acts to refract more light into the sensing region of a sensor.

Masking material 610 is a material suitable for blocking and/or absorbing light received at facet 608. In the depicted example, masking material 610 is black photoresist material (i.e., black matrix); however, myriad materials suitable for use in masking material 610 will be apparent to the skilled artisan after reading this Specification.

It is to be understood that the present specification teaches some examples of an exemplary embodiment of the present invention and that many variations of the invention can easily be devised by those skilled in the art after reading this disclosure and that the scope of the present invention is to be determined by the following claims.

What is claimed is:

1. An organic light-emitting diode (OLED) display system having visual performance pixel compensation or loss of brightness, the OLED display system comprising:

(a) a plurality of OLED-based display pixels, each display pixel comprising pixel drive circuitry;

(b) a sensing system comprising a plurality of sensors;

(c) a processor comprising:

(i) a lock-in amplifier (LIA);

(ii) a low pass filter (LPF); and (iii) analog to digital (ADC) circuitry operatively connected to each of the sensors, the ADC circuitry providing a sensor signal for each of the sensors;

the processor adapted to:

(iv) apply a drive signal having a periodic signal embedded therein to at least one OLED pixel in the display;

(v) receive the sensor signal from the ADC circuitry for each sensor;

(vi) provide a primary frequency component from the sensor signals using the LIA based on the periodic signal;

(vi) provide secondary frequency components from the sensor signals using the LPF;

(vii) convert the secondary frequency components to a digital signal using the ADC;

(viii) provide the digital signal to the processor as a sensing signal; and (ix) determine compensation for the drive signal.

2. The OLED display system of claim 1, wherein the processor includes an amplifier, and wherein the processor is adapted to amplify the secondary frequency components.

3. The OLED display system of claim 1, wherein the display system comprises a preamplifier for amplifying the sensor signals from the ADC without adding significant noise to the signals.

4. The OLED display system of claim 1, wherein the sensors are photodetectors.

5. The OLED display system of claim 1, wherein the sensors are oriented orthogonally to a plane of the display system.

6. The OLED display system of claim 1, wherein the drive signal having the periodic signal is modulated using pulse-width modulation (PWM) having the primary frequency.

7. The OLED display system of claim 1, wherein the periodic signal is a display refresh rate multiplied by a number of pulse-width modulation pulses per display frame.

8. The OLED display system of claim 1, wherein at least one of the sensors of the sensing system comprises a cover glass, a sensor and grating, wherein the grating comprises patterns of slits formed into at least one sidewall of the cover glass.

9. The OLED display system of claim 1, wherein at least one of the sensors of the sensing system comprises a cover glass, a sensor, a facet and masking material, wherein the facet is a beveled edge of the cover glass configured to increase area available for mounting the sensor, and wherein the masking material is for blocking and absorbing light received at the facet.

10. The OLED display system of claim 9, wherein the masking material is a photoresist material.

11. A method for compensating at least one pixel for an image in an organic light-emitting diode display system comprising a plurality of OLED-based display pixels, wherein each display pixel comprises pixel drive circuitry, the method comprising the steps of:

(a) providing a sensing system comprising a plurality of sensors and a processor, the processor comprising:

(i) a lock-in amplifier (LIA);

(ii) a low pass filter (LPF); and (iii) analog to digital (ADC) circuitry operatively connected to each of the sensors, the ADC circuitry providing a sensor signal for each of the sensors;

(b) applying a drive signal having a periodic signal embedded therein to at least one OLED pixel in the display;

(c) receiving the sensor signal from the ADC circuitry for each sensor;

(d) providing a primary frequency component from the sensor signals using the LIA based on the periodic signal;

(e) providing secondary frequency components from the sensor signals using the LPF;

(f) converting the secondary frequency components to a digital signal using the ADC;

(g) providing the digital signal to the processor as a sensing signal; and (h) determining compensation for the drive signal.

12. The method of claim 11, wherein the step including providing the processor includes providing an amplifier, and the method includes amplifying the secondary frequency components.

13. The method of claim 11, wherein the step of providing the processor includes providing a preamplifier, and the method includes amplifying the sensor signals with the preamplifier from the ADC without adding significant noise to the signals.

14. The method of claim 11, including the step of modulating the drive signal using pulse-width modulation (PWM) having the primary frequency.

15. The method of claim 11, wherein the step of applying a drive signal having a periodic signal embedded therein includes a periodic signal is a display refresh rate multiplied by a number of pulse-width modulation pulses per display frame.

* * * * *